United States Patent [19]
Takeuchi et al.

[11] Patent Number: 5,897,820
[45] Date of Patent: *Apr. 27, 1999

[54] METHOD OF REMOVING PAINT FILM ON RESIN SURFACE AND APPARATUS THEREFOR

[75] Inventors: Naokazu Takeuchi; Yuji Inagaki; Seiji Ando; Tooru Ikeya; Fumihiro Harada, all of Nagoya, Japan

[73] Assignee: Mitsubishi Jukogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/686,689

[22] Filed: Jul. 26, 1996

[30] Foreign Application Priority Data

Aug. 1, 1995 [JP] Japan .................................... 7-196317
Jun. 21, 1996 [JP] Japan .................................... 8-161289

[51] Int. Cl.⁶ .......................... B32B 31/00; B27B 17/00; B28B 11/08
[52] U.S. Cl. .......................... 264/139; 264/37; 264/291; 264/911
[58] Field of Search ............................. 264/37, 139, 291, 264/911–921

[56] References Cited

U.S. PATENT DOCUMENTS 3,775,212 11/1973 Iwasaki et al. .......................... 156/220

FOREIGN PATENT DOCUMENTS 0650813 5/1995 European Pat. Off. .

OTHER PUBLICATIONS

Patent Abstracts of Japan, vol. 95, No. 10, Nov. 30, 1995; & JP,A,07–171 832 (Mitsubishi Chem Corp; Fuji Heavy Ind), Jul. 11, 1995.

*Primary Examiner*—Jeffrey Stucker
*Assistant Examiner*—Hankyel T. Park
*Attorney, Agent, or Firm*—Wenderoth, Lind, & Ponack, L.L.P.

[57] ABSTRACT

A method of removing a paint film formed on the surface of a resin material, and an apparatus therefor are disclosed. The method comprises heating the resin material having the paint film formed on the surface thereof to deform the resin material, and peeling the paint film from the resin material, and the apparatus comprises a heating means for heating the resin material having the paint film formed on the surface thereof, and a deformation means for deforming the heated resin material and peeling the paint film from the resin material. The method and the apparatus enable one to remove the paint film formed on the surface of the resin material uniformly without deterioration of the resin material and contamination with foreign materials of the resin material even in a resin material having any shape.

18 Claims, 11 Drawing Sheets

FIG. 3

LOADED STATE
(a)

UNLOADED STATE
(b)

METHOD OF REMOVING PAINT FILM ON RESIN SURFACE AND APPARATUS THEREFOR

FIELD OF THE INVENTION

The present invention relates to a method of removing a paint film formed on the surface of a resin material, and an apparatus for removing the paint film.

BACKGROUND OF THE INVENTION

In recent years, investigations are made to recycle spent resin materials from the standpoint of environmental protection. If a paint film is formed on the surface of the spent resin materials, when the resin materials are processed for recycling, the resin materials are contaminated by the paint film, resulting in great reduction in mechanical properties of the resin materials. Therefore, it is necessary to previously remove the paint film from the surface of the resin materials prior to process for recycling. For this reason, in recycling resin materials having a paint film formed on the surface thereof, proposals have been made for a method of removing a paint film by shot blasting, a method of melting the resin materials with an extrusion molding machine and filtering the molten resins through a filter to remove a paint film, or a method of rolling the resin materials using rolls and the like and removing a paint film by shearing action due to circumferential speed difference between rolls, as disclosed in, for example, Japanese Laid-open Patent Application 7-214558 and Japanese Laid-open Patent Applications 7-256640, 7-256641, 7-256642 and 7-256643.

However, when removing the paint film by the methods as described above, there arises the following problems:

(1) Shot blasting method a) If a molding shape of the resin material is complicated, it is difficult to uniformly remove the paint film, thereby taking much time.

b) If shot used in blasting is increased in order to enhance processing efficiency, the resin material burns, resulting in deterioration of quality of the resin material, or the blast is embedded in the resin material, causing contamination with foreign materials.

(2) Filtration method with filter a) If a filter having fine mesh is used, the paint film is substantially removed, but if the paint film has a small thickness, the elongated cut paint film may not be filtered off, resulting in contamination with such a paint film.

b) Since it takes much time for filtration, if its extrusion force is increased, excessive compression load is applied to the resin material, resulting in deterioration of the resin material.

(3) Rolling method with rolls

Since the rolling is conducted at a temperature of less than 70° C., such a temperature is too low to deform the resin material. Therefore, it is difficult to introduce the resin material into the rolls, and also the resin material may not sufficiently be deformed by the rolls. For this reason, the resin material must be flattened with a specific press, or the resin material must be finely divided so as to relatively increase flat portions, thus requiring complicated procedures and taking much time.

SUMMARY OF THE INVENTION

Various investigations have been made to overcome the above-described problems involved in the prior art.

Accordingly, an object of the present invention is to provide a method for removing a paint film formed on the surface of a resin material.

Another object of the present invention is to provide an apparatus for removing a paint film formed on the surface of a resin material.

The method of removing a paint film formed on the surface of a resin material according to the present invention comprises heating a resin material having a paint film formed on the surface thereof to deform the resin material, and peeling the paint film from the resin material.

The above method of removing a paint film is characterized in that at least the paint film is heated to soften the paint film, thereafter, compression force is applied to the paint film, and then the compression force is removed, thereby applying a shearing stress to an interface between the paint film and the resin material.

The above method of removing a paint film is characterized in that the resin material is heated to a temperature range such that the difference in dynamic modulus of elasticity between the paint film and the resin material is large.

The above method of removing a paint film is characterized in that the paint film is a material comprising a thermosetting resin type paint film.

The above method of removing a paint film is characterized in that the heating temperature is in a range of 70 to 150° C.

The above method of removing a paint film is characterized in that the resin material that forms a molded product having a solid form and the paint film are heated to soften those, thereafter, compression force is applied to the resin material and the paint film to cause plastic deformation of the resin material and the paint film, and then a shearing stress is applied to the interface between the resin material and the paint film, thereby simultaneously conducting flattening of the resin material and peeling of the paint film.

The above method of removing a paint film is characterized in that the the resin material that forms a molded product having an approximately flat shape and the paint film are heated to soften them, thereafter, compression force is applied to the resin material and the paint film to cause plastic deformation of the resin material and the paint film, and simultaneously a shearing stress is applied to the interface between the resin material and the paint film.

The above method of removing a paint film is characterized in that the resin material and the paint film are heated to soften them, thereafter, compression force and stretching force are applied to the resin material and the paint film to cause plastic deformation of the resin material and the paint film, and simultaneously a shearing stress is applied to the interface between the resin material and the paint film.

The above method of removing a paint film is characterized in that the resin material that forms a molded product having a solid form and the paint film are heated to soften them, thereafter, the resin material is flattened, compression force is applied to the resin material and the paint film to cause plastic deformation of the resin material and the paint film, and simultaneously a shearing stress is applied to the interface between the resin material and the paint film.

The above method of removing a paint film is characterized in that the resin material is flattened, thereafter, the resin material is cut so as to be divided, and then compression force is applied to the resin material and the paint film.

The above method of removing a paint film is characterized in that the paint film peeled from the resin material is collected.

The apparatus for removing a paint film formed on the surface of a resin material according to the present invention comprises a heating means for heating the resin material having the paint film formed on the surface thereof, and a deformation means for deforming the heated resin material and peeling the paint film from the resin material.

The above apparatus for removing a paint film is characterized in that the a heating chamber to surround the heating means is provided, and the deformation means is arranged in the heating chamber.

The above apparatus for removing a paint film is characterized in that the heating means is equipped with at least heaters that heat the paint film, and the deformation means is equipped with rolling rolls that compress and deform the resin material.

The above apparatus for removing a paint film is characterized in that the deformation means is equipped with a pair of rolling rolls that compress and deform the resin material, and the rolling rolls also have a function of the heating means by generation of heat from the rolling rolls at the side contacting the paint film.

The above apparatus for removing a paint film is characterized in that the heating means is equipped with heaters that heat the resin material and the paint film, and the deformation means is equipped with rolling rolls that compress and deform the resin material.

The above apparatus for removing a paint film is characterized in that the deformation means and the heating means are formed by a pair of the rolling rolls that compress and deform the resin material and are capable of generating heat.

The above apparatus for removing a paint film is characterized in that the deformation means is equipped with a stretching means that stretches the resin material.

The above apparatus for removing a paint film is characterized in that a flattening means is provided, which flattens the heated resin material prior to deformation of the heated resin material with the deformation means.

The above apparatus for removing a paint film is characterized in that a heating chamber for surrounding the heating means is provided, and the flattening means is arranged in the heating chamber.

The above apparatus for removing a paint film is characterized in that the flattening means is a pair of rolls that compress the resin material, and the rolls have a gear shape.

The above apparatus for removing a paint film is characterized in that the flattening means is a pair of rolls that compress the resin material, wherein a cross section in one axis direction of the rolls has a concave shape showing an approximately X form, and a cross section in another axis direction of the rolls has a convex shape showing an approximately rhombic form.

The above apparatus for removing a paint film is characterized in that the flattening means is a pair of rolls that compress the resin material, wherein a cross section in one axis direction of the rolls is a concave shape showing an approximately hand drum form, and a cross section in another axis direction of the rolls is a convex shape showing an approximately drum form.

The above apparatus for removing a paint film is characterized in that one of the rolls contacts with the paint film side, and another of the rolls contacts with the resin material.

The above apparatus for removing a paint film is characterized in that a cutting means is provided, which cuts so as to divide the resin material flattened with the flattening means.

The above apparatus for removing a paint film is characterized in that a heating chamber for surrounding the heating means is provided, and the cutting means is arranged in the heating chamber.

The above apparatus for removing a paint film is characterized in that a heating chamber for surrounding the heating means is provided, and the collecting means is arranged in the heating chamber.

The above apparatus for removing a paint film is characterized in that a collecting means is provided, which collects the paint film peeled from the resin material.

According to the method of removing a paint film formed on the surface of a resin material and the apparatus therefor, the following effects can be obtained.

(1) The paint film can be uniformly removed, regardless of the shape of the resin material.

(2) The resin material is not contaminated with foreign materials.

(3) Burning does not occur on the resin material, and it is not necessary to apply excessive compression force, making it possible to prevent deterioration of the resin materials.

(4) Utilizing the difference in modulus of elasticity between the paint film and the resin material, which difference is remarkably depending on heating. Therefore, it is not necessary to scratch out the paint film, and the paint film can be peeled nicely. As a result, it is possible to improve the quality of the resin material after peeling the paint film, and also yield increases.

(5) A reciprocal shearing stress acts on the interface between the paint film and the resin material by elastic deformation of the paint film and plastic deformation of the resin material. Therefore, the paint film can be peeled with good efficiency.

(6) Peeling effect does not change greatly even if the materials of the resin and the paint film are different. Therefore, it is not necessary to classify the resin materials into groups based on their differences, and it is therefore possible to enhance work efficiency.

(7) Even molded products having a complicated solid shape such as a ship shape or a box shape, for example, bumpers of automobiles, can be processed in the same manner as in a molded product having an approximately flat shape.

(8) Since a roll system is employed, processing efficiency is high.

(9) In a heating roll method both heating and rolling can be conducted simultaneously. Therefore, time required for the process can be shortened.

(10) By using a heater that utilizes radiation heat, heating can be conducted without pollution of the surrounding environment.

(11) By applying a heater that uses a fluid medium, heating can be conducted using a device having a simple structure.

(12) A molded product is cut so as to be divided and then rolled. Therefore, it is possible to suppress the ununiformity of thickness in the direction of width of the molded product, and it is also possible to prevent the molded product from snaking at rolling.

(13) By setting difference of circumferential speed in a predetermined degree to a pair of rolls, peeling of the paint film from the resin material can be conducted with good efficiency.

(14) By using a collecting means, it is possible to prevent problems due to scattering or re-adhering of the paint film.

DESCRIPTION OF THE PREFERRED EMBODIMENT

Embodiments of the Method

Various embodiments (first to seventh embodiments) of the method of removing a paint film formed on the surface of the resin material according to the present invention are explained using FIGS. 1 to 4.

Figure 1:
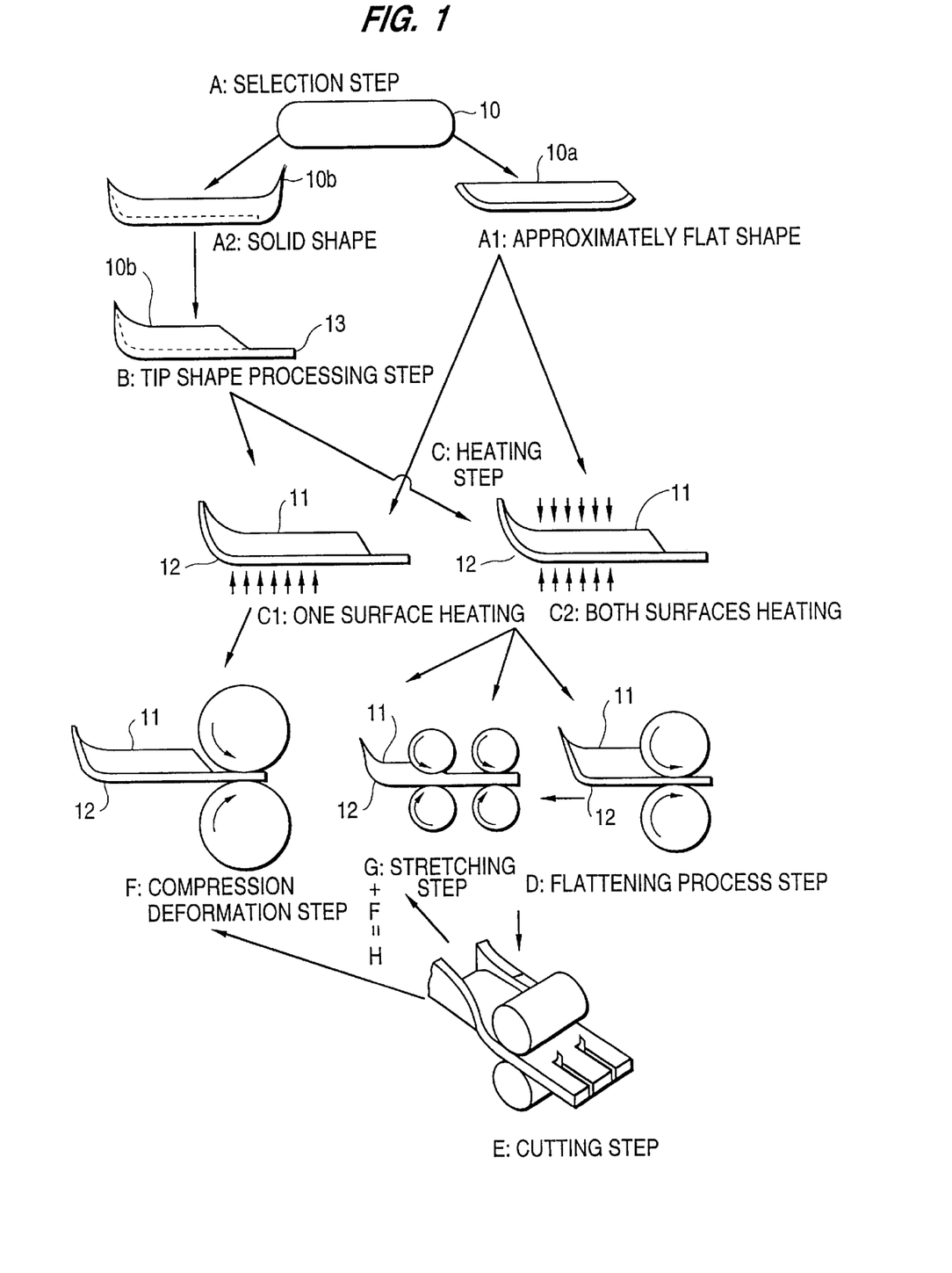
FIG. 1 is a view explaining steps of various embodiments in the method of removing a paint film formed on the surface of the resin material according to the present invention.
Figure 2:
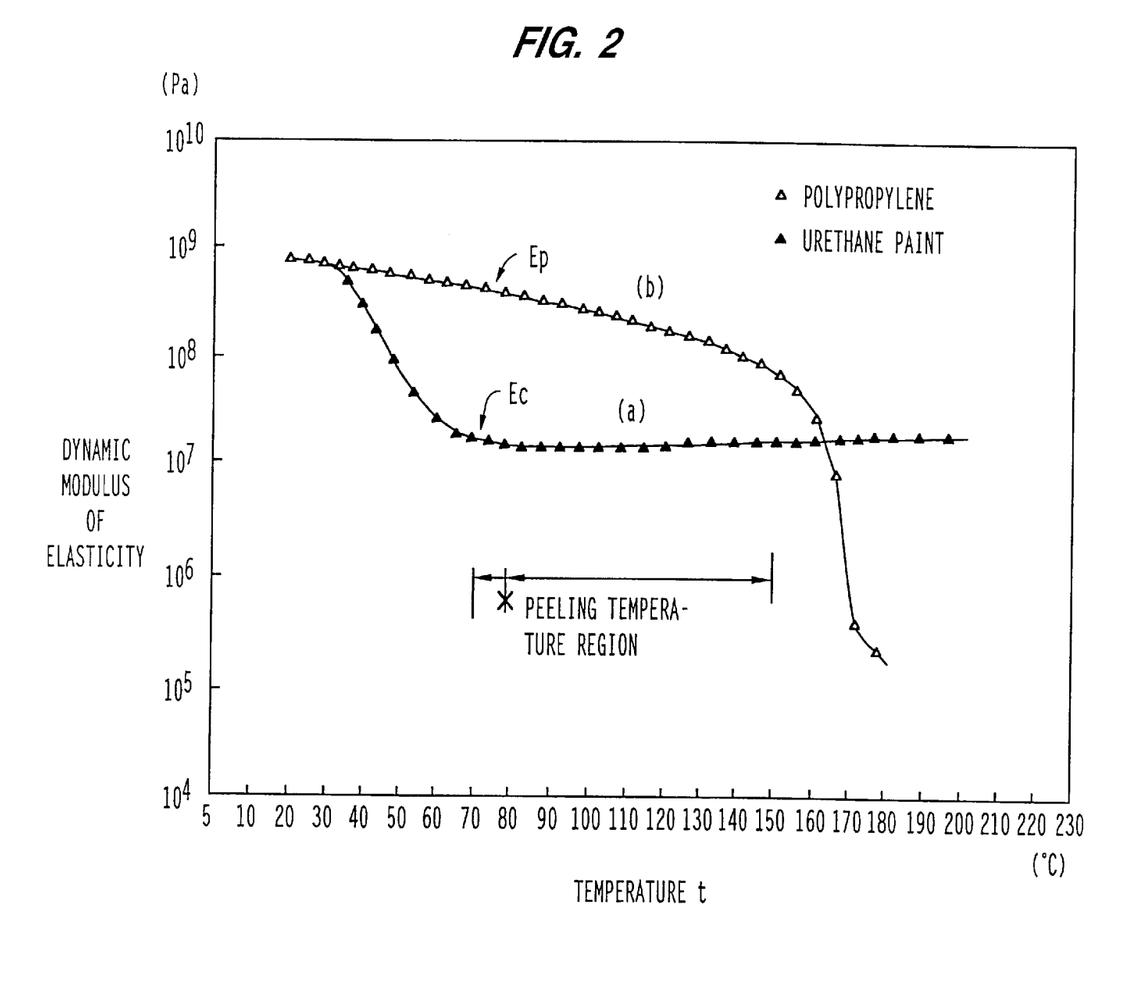
FIG. 2 is a graph showing characteristic softening properties by heating of the resin material and the paint film.
Figure 3:
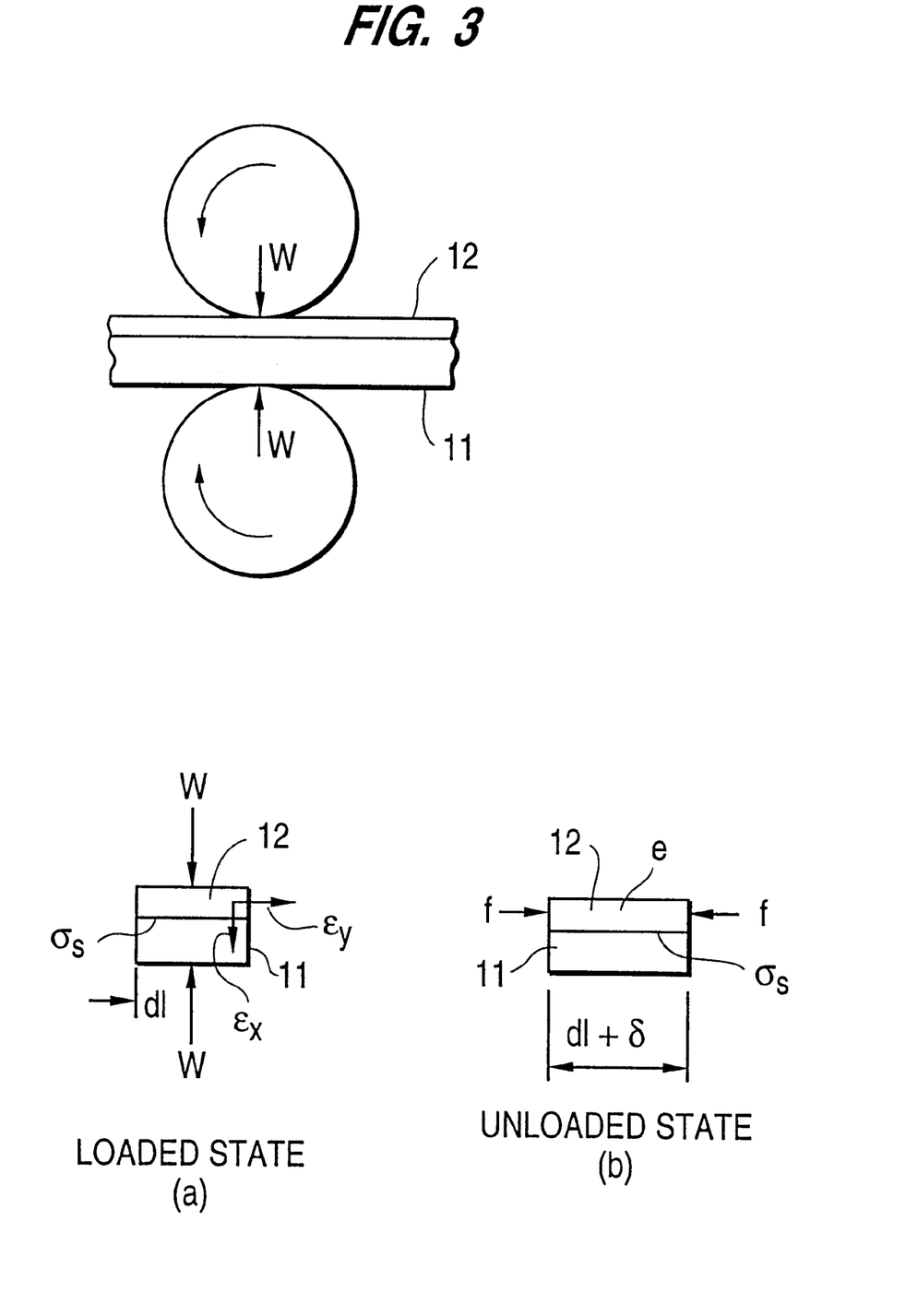
FIG. 3 is a view explaining generation of shearing force and its function.

FIG. 1 is a view explaining the steps of various embodiments, FIG. 2 is a graph showing softening properties observed typically in heating of the resin material and the paint film, and FIG. 3 is a view explaining generation of a shearing force and its function. Regarding the same portions in the embodiment already explained, the explanation thereof is omitted by applying the same marks as the marks used in the embodiment already explained.

In FIG. 1, A is a step for selecting resin form, A1 is a step for selecting an approximately flat shape, and A2 is a step for selecting a solid shape other than an approximately flat shape, such as a ship shape or a box shape. B is a step for processing a tip shape, C is a step for heat treatment, C1 is a step for heating one surface (paint film), and C2 is a step for heating both surfaces (paint film and resin material). D is a step for flattening process, E is a cutting step, F is a compression deformation step, and G is a stretching step. 10 is a molded product, 10a is a molded product having an approximately flat shape, 10b is a molded product having a complicated solid shape, such as ship shape or a box shape, for example, bumpers of automobiles, 11 is a resin material, and 12 is a paint film. The molded products 10, 10a, 10b comprise the resin material 11 having the paint film 12 formed on the surface thereof.

In FIG. 2, Ep means a dynamic modulus of elasticity of the resin material (polypropylene), Ec means a dynamic modulus of elasticity of the paint film (urethane paint which is a thermosetting resin), t represents a temperature.

In FIG. 3, W is a compression load, δ is a plastic strain amount, d1 is an initial length (micro-length), $\sigma_s$ is a shearing stress in the boundary surface, $\epsilon_x$ is a strain in the direction of load, $\epsilon_y$ is a strain in the direction crossing the direction of load, e is a strain energy of the paint film, $e_e$ is a strain energy of the paint film that acts to the direction crossing the direction of load, and f is a recovery force by e.

First embodiment:

This embodiment proceeds in the order of steps A1, C1 and F in FIG. 1.

Specifically, after step A1 for selecting the molded product 10a having an approximately flat shape and step C1 in which at least the paint film (12) side of the molded product 10a is heated to soften the paint film 12, the paint film is compression deformed (rolled) to remove load (F).

This function is explained below.

When heat of 70° C. or more is applied to the paint film 12 (in general, an urethane paint is mainly used), the modulus of elasticity of the paint film reaches the minimum point as shown by curve a in FIG. 2, and the paint film softens. On the other hand, the resin material 11 (in general, a polypropylene is mainly used) maintains its original shape even if heat of about 70° C. is applied thereto, as shown by curve b in FIG. 2.

For the above reason, when heat of 70° C. or more is applied to the molded product 10a and a compression load W is then applied thereto as shown in FIG. 3, the paint film 12 receives the strain of $\epsilon_x$ and $\epsilon_y$ as shown in (a) of FIG. 3. When the shearing force $\sigma_s$ acts to the boundary surface between the resin material 11 and the paint film 12 by $\epsilon_y$, breakage of the paint film 12 itself occurs by $\epsilon_x$, and on the other hand, peeling occurs between the paint film 12 and the resin material 11 by $\epsilon_y$. A strain energy e is accumulated in the paint film 12 adhered to the resin material 12 without peeling.

Subsequently, when removing the load, a recovery force f acts to the paint film 12 adhered to the resin material 11 by the above strain energy e as shown by (b) in FIG. 3. In this case, the shearing force $\sigma_s$ acts to the boundary surface between the resin material 11 and the paint film 12.

Therefore, if the paint film 12 is successively compression deformed while heating to 70° C. or more as described above, $\epsilon_x$ and $\epsilon_y$ act everywhere on the paint film 12. As a result, a reciprocal shearing force $\sigma_s$ acts, so that the paint film on the surface of the resin material 11 can be removed. The above step F can be easily conducted to the molded product 10a having an approximately flat shape.

Second embodiment:

This embodiment proceeds in the order of steps A2, B, C2 and F as shown in FIG. 1.

Specifically, after step A1 for selecting the molded product 10b having a complicated solid shape such as a ship shape or a box shape, for example, bumpers of automobiles, the tip of the molded product 10b is processed into a flat portion 13 having a flat and tapering shape (step B), and both the surfaces of the molded product 10b, i.e., the resin material 11 side and the paint film 12 side, are heated (step C2), compression load is applied to the molded product 10b (step F).

The molded product 10b having a complicated solid shape is softened by step C2, and then subjected to plastic deformation so as to greatly displace in step F, so that compression force is applied while molding into an approximately flat shape. That is, by subjecting step B to the molded product 10b having a complicated solid shape, step F can easily be conducted subsequent to step C2, thereby exhibiting the same function as in the above-described embodiment. By this procedure, the paint film 12 can be removed even in the molded product 10b having a complicated solid shape similar to the molded product 10a having an approximately flat shape.

Third embodiment:

This embodiment proceeds in the order of steps A1, C2 and F as shown in FIG. 1.

Specifically, after step A1 for selecting the molded product 10a having an approximately flat shape and step C2 for heating both surfaces of the molded product 10a, i.e., the resin material 11 side and the paint film 12 side, compression load is applied to the molded product. Then the compression load is removed (step F).

This function is explained below.

The resin material 11 and the paint film 12 each soften by step C2 as shown in FIG. 2. Large shearing force $\sigma_s$ is acted on the softened paint film 12 by its own strain $\epsilon_x$ due to the compression load W and the strain $\epsilon_y$ at the boundary surface due to deformation of the resin material 11 by passing through step F. The paint film 12 breaks by the strain $\epsilon_x$, and the paint film 12 peels by the strain $\epsilon_y$. As a result, the paint film 12 is removed from the resin material 11.

On the other hand, if the compression load W is removed, the shearing force $\sigma_s$ again acts to the boundary surface between the paint film 12 and the resin material 11 by the recovery force f due to the strain energy e accumulated in the paint film, and the paint film is removed from the surface of the resin material 11.

Fourth embodiment:

This embodiment proceeds in the order of steps A2, B, C2, and F+G (=H) as shown in FIG. 1.

Specifically, after step A1 for selecting the molded product 10b having a complicated solid shape, step B for processing the tip of the molded product 10b into a flat portion 13 having a flat and tapering shape, and step C2 for heating both surfaces of the molded product 10b, i.e., the resin material 11 side and the paint film 12 side, compression load is applied to the molded product 10b (step F) and simultaneously stretching load is applied thereto (step G).

The above stretching step G can be easily conducted by continuously conducting the compression deformation steps two times. That is, by compression deforming the molded product 10b with two pairs of rollers in which a take-off speed of the downstream side rollers is faster than that of the upstream side rollers, the stretching step G can be conducted between rollers, i.e., between two compression deformation steps F.

By such a stretching step G, the resin material 11 and the paint film 12 simultaneously undergo the strain $\epsilon_y$ in the direction of length. The resin material 11 shows plastic deformation, whereas the paint film 12 shows elastic deformation. Therefore, the strain energy e is accumulated in the paint film 12 even after the stretching process. As a result, the shearing stress $\sigma_s$ acts to the boundary surface between the paint film 12 and the resin material 11 by recovery force of the strain energy e, and the paint film 12 peels.

From the mutual action of, for example, breakage of the paint film 12 by the strain $\epsilon_x$ in the twice compression deformation steps F and the stretching step G, and peeling of the paint film 12 by the shearing stress $\sigma_s$ in the stretching step G, the breakage and peeling occur everywhere on the paint film 12, and the paint film 12 is removed from the resin material 11.

Fifth embodiment:

This embodiment proceeds in the order of steps A2, B, C2, D, and F+G (=H) as shown in FIG. 1.

Specifically, after step A1 for selecting the molded product 10b having a complicated solid shape, step B for processing the tip of the molded product 10b into the flat portion 13 having a flat and tapering shape, and step C2 for heating both surfaces of the molded product 10b, i.e., the resin material 11 side and the paint film 12 side, the molded product is flattened (step D). Thereafter, compression load is applied to the molded product 10b and simultaneously stretching load is applied thereto (step G).

Thus, in this embodiment, step D is conducted after step C in the above-described fourth embodiment. If the tip of the molded product 10b having a complicated solid shape is processed in its shape and also both surfaces thereof are heated, the molded product 10b can be easily flattened. As a result, even where stretching process is subjected to the molded product 10b having a complicated solid shape, the stretching process can easily be conducted.

Sixth embodiment:

This embodiment proceeds in the order of steps A2, B, C2, D, E and F+G (=H) as shown in FIG. 1.

In this embodiment, cutting step E is conducted after the flattening process step D in the above-described fifth embodiment.

The cutting step E can easily be conducted by providing a rotary or fixed blade between step D and step H. The cutting force in this cutting step E can be obtained by a delivery force of the molded product 10b in step D or a take-off force of the molded product 10b in step H.

In such a cutting step E, if the molded product 10b is cut with a small size in the direction of length, the degree of ununiformity of the distribution of the molded product 10b in the direction of width in step H, which is based on the ununiformity of the thickness distribution in the direction of width or in the direction of length of the molded product 10b, is small, and the molded product 10b can be prevented from snaking. Thus, step H can be conducted in a stable manner.

Seventh embodiment:

This embodiment is that the peeled paint film 12 is suctionally removed with a vacuum device equipped with a filter in each of the above-described embodiments. The peeled paint film 12 is finely divided, and is liable to scatter.

Therefore, the workability can be improved by the suction removal as described above.

Embodiment of Apparatus

Each of the embodiments (first to tenth embodiments) in the apparatus for removing a paint film formed on the surface of the resin material according to the present invention is explained by referring to the accompanying drawings. Regarding the same portions in the embodiment already explained, the explanation thereof is omitted by applying the same marks as used in the embodiment already described.

[First embodiment: One surface heating]

Figure 4:
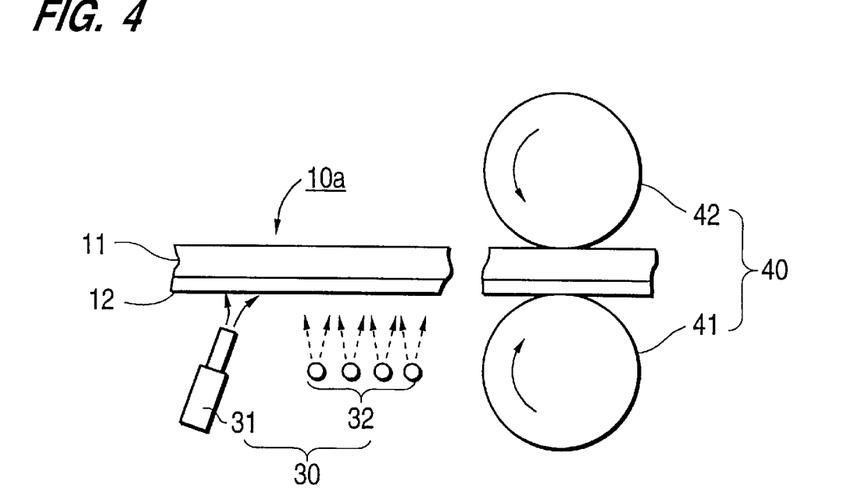
FIG. 4 is a schematic structural view showing the main portion of a first embodiment in the apparatus for removing a paint film formed on the surface of the resin material according to the present invention.

FIG. 4 is a schematic structural view of the main portion.

In FIG. 4, 10a is a molded product having an approximately flat shape, 11 is a resin material, and 12 is a paint film. Further, 30 is a heater, 31 is a fluid medium heater using a fluid heat medium such as flame, hot air or steam, and 32 is a radiation heater using a radiation heat such as resistance wire or infrared ray. Also, 40 is a rolling roll, 41 is a paint film side roll, and 42 is a resin material side roll.

The heater 30 heats the molded product 10a from at least the paint film 12 side. The rolling rolls 40 continuously bite the molded product 10a heated with the heater 30 to conduct compression deformation (rolling). In this embodiment, a heating means is constituted by the heater 30 or the like, and a deformation means is constituted by the rolling rolls 40 or the like.

Therefore, according such an apparatus, the paint film 12 can be removed by conducting the step explained in the first embodiment in the method of removing a paint film formed on the surface of the resin material as described above.

[Second embodiment: One surface roll heating]

Figure 5:
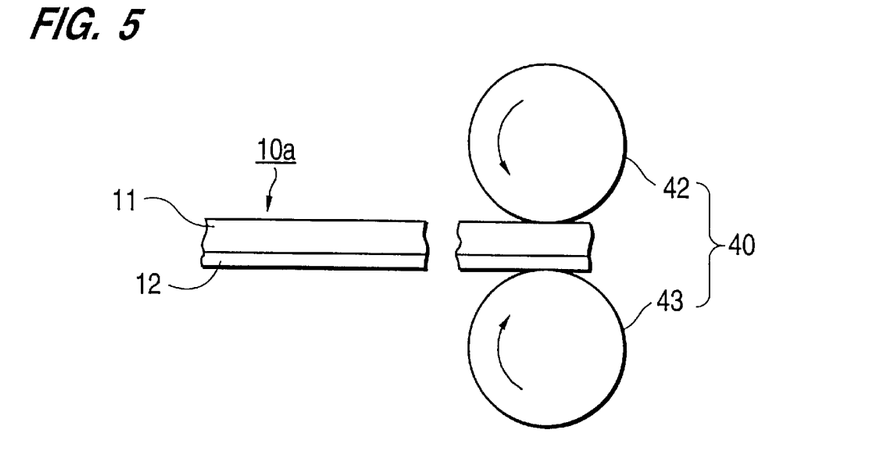
FIG. 5 is a schematic structural view showing the main portion of a second embodiment in the apparatus for removing a paint film formed on the surface of the resin material according to the present invention.

FIG. 5 is a schematic structural view of the main portion.

In FIG. 5, 10a is a molded product having an approximately flat shape, 11 is a resin material, 12 is a paint film. Further, 40 is rolling rolls, 42 is a resin material side roll, and 43 is a paint film side roll. The rolling rolls 40 can continuously bite the molded product 10a to conduct compression deformation (rolling) and simultaneously heat the molded product 10a with the paint film side roll 43 from the paint film 12 side.

That is, according to this embodiment the molded product 10a is heated using the paint film side heating roll 43 in place of the heater 30 in the above-described first embodiment. In this embodiment, a deformation means is constituted by the rolling roll 40 or the like, and a heating means is constituted by the paint film side heating roll 43 or the like. That is, the paint film side heating roll 43 has the function of both deformation means and heating means.

Therefore, according to this apparatus, the paint film 12 can be removed in the same manner as in the above-described first embodiment, although the apparatus structure is more simplified compared with the apparatus in the first embodiment.

[Third embodiment: both surfaces heating (in the case of an approximately flat shape)]

Figure 6:
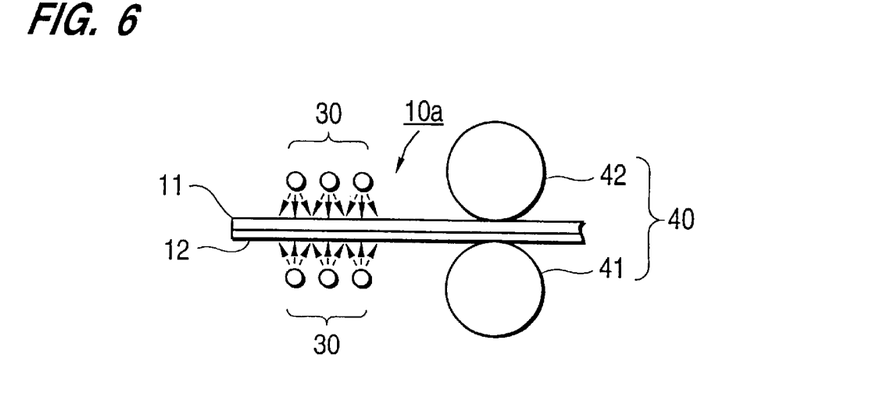
FIG. 6 is a schematic structural view showing the main portion of a third embodiment in the apparatus for removing a paint film formed on the surface of the resin material according to the present invention.

FIG. 6 is a schematic structural view of the main portion.

In FIG. 6, 10a is a molded product having an approximately flat shape, 11 is a resin material, 12 is a paint film. 30 is a fluid medium heater or a radiation heater. Further, 40 is a rolling roll, 41 is a paint film side roll, and 42 is a resin material side roll.

The heater 30 is provided so as to heat the molded product 10a from both sides thereof, i.e., from the resin material 11 side, and the paint film 12 side.

That is, according to this embodiment, the molded product 10a is heated from both sides thereof in place of one surface heating in the above-described first embodiment.

Therefore, according to this apparatus, the paint film 12 can be removed by conducting the step explained in the second embodiment of the method of removing a paint film formed on the surface of the resin material as described above.

[Fourth embodiment: Both surfaces heating (in the case of a solid shape)]

Figure 7:
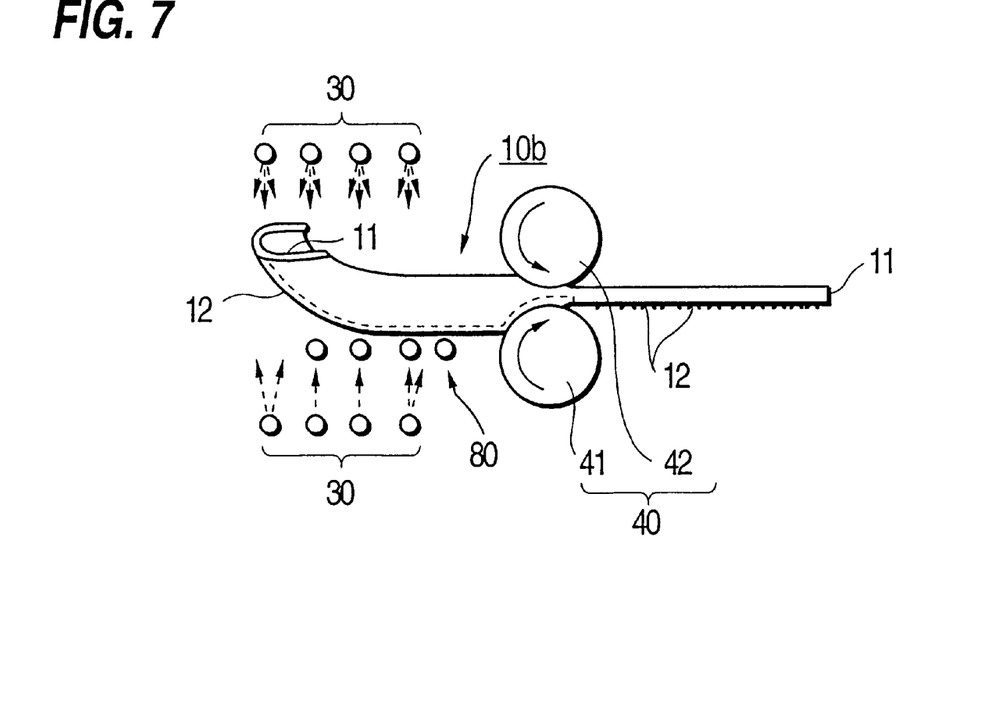
FIG. 7 is a schematic structural view showing the main portion of a fourth embodiment in the apparatus for removing a paint film formed on the surface of the resin material according to the present invention.
Figures 8A, 8B:
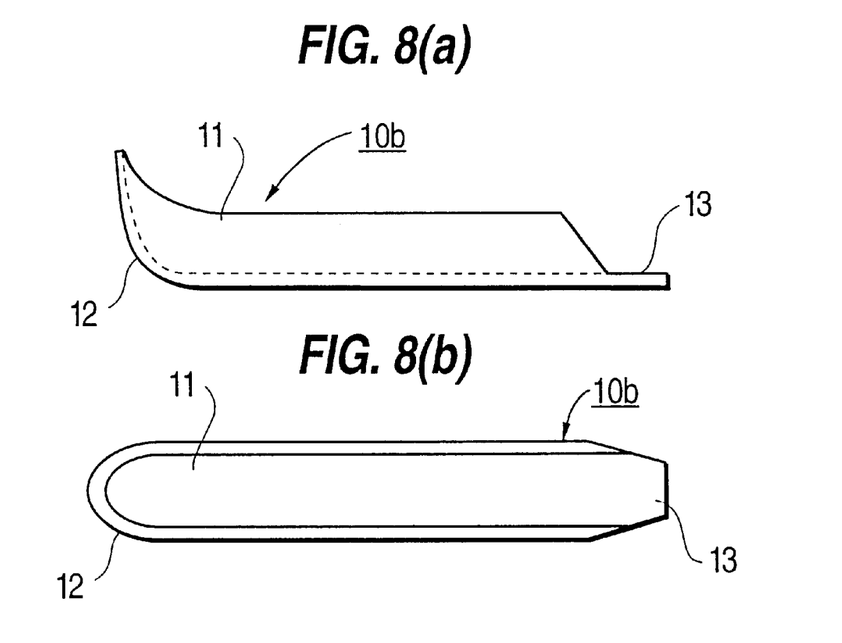
FIGS. 8(a) and 8(b) are views explaining one example of processing a molded product having a complicated solid shape.

FIG. 7 is a schematic structural view of the main portion, and FIG. 8 is a view explaining the process example of a molded product having a complicated solid shape, wherein (a) is a side view, and (b) is a plane view.

In FIGS. 7 and 8(a) and (b), 10b is a molded product having a complicated solid shape such as a ship shape or a box shape, for example, bumpers of automobiles, 11 is a resin material, 12 is a paint film, and 13 is a flat portion. Further, 30 is a heater, 31 is a fluid medium heater (not shown), and 32 is a radiation heater. Also, 40 is a rolling roll, 41 is a paint film side roll 42 is a resin material side roll, and 80 is a guide roll.

The molded product 10b having a complicated solid shape, such as bumpers of automobiles, is processed with the side edges previously cut so that one end (top end) of the bottom plate forms a flat portion 13 having an approximately trapezoid in a projected cross-section shape, as shown in FIGS. 8(a) and (b). The heater 30 is provided so as to heat the molded product 10b from both surfaces thereof, i.e., from the resin material 11 side and the paint film 12 side. The rolling roll 40 can bite the molded product 10b heated with the heater 30 from the flat portion 13 to conduct compression deformation (rolling). That is, the molded product 10b forms the flat portion 13 in the top edge so that the molded product 10b is easily bitten by the rolling roll 40.

Therefore, according to this apparatus, the paint film 12 can easily be removed in the same manner as in the above-described third embodiment. Further, the molded product 10b can be guided to the rolling roll 40 using the guide roll 80, so that the molded product 10b can be delivered to the rolling roll 40 in a stable manner. A guide plate may be used in place of the guide roll 80.

[Fifth embodiment: Both surfaces heating (in the case of an approximately flat shape)]

Figure 9:
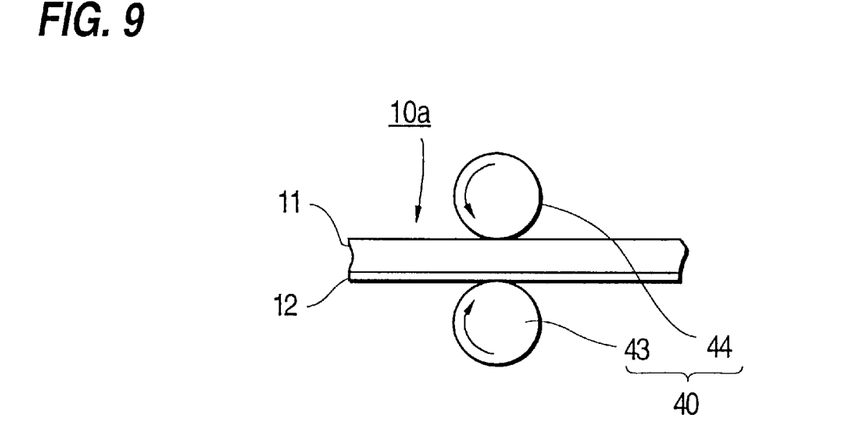
FIG. 9 is a schematic structural view showing the main portion of a fifth embodiment in the apparatus for removing a paint film formed on the surface of the resin material according to the present invention.

FIG. 9 is a schematic structural view of the main portion.

In FIG. 9, 10a is a molded product having an approximately flat shape, 11 is a resin material, and 12 is a paint film. Further, 40 is a rolling roll, 43 is a paint film side heating roll, and 44 is a resin material side heating roll.

The rolling roll 40 can continuously bite the molded product 10a to conduct compression deformation (rolling), and simultaneously heat the molded product 10a from both surfaces of the resin material 11 side and the paint film 12 side with the paint film side heating roll 43 and the resin material side heating roll 44.

That is, according to this embodiment, the molded product 10a is heated with the rolling roll from both sides thereof in place of the heater 30 in the above-described third embodiment, while deforming under compression the molded product 10a with the paint film side heating roll 43 and the resin material side heating roll 44. In this embodiment, the rolling roll 40 has the function of both heating means and deformation means.

Therefore, according to this apparatus, the paint film 12 can be removed in the same manner as in the above-described third embodiment, although simplifying the apparatus structure is more simplified compared with the apparatus in the above-described third embodiment.

[Sixth embodiment: Both surfaces heating (in the case of a solid shape)]

Figure 10:
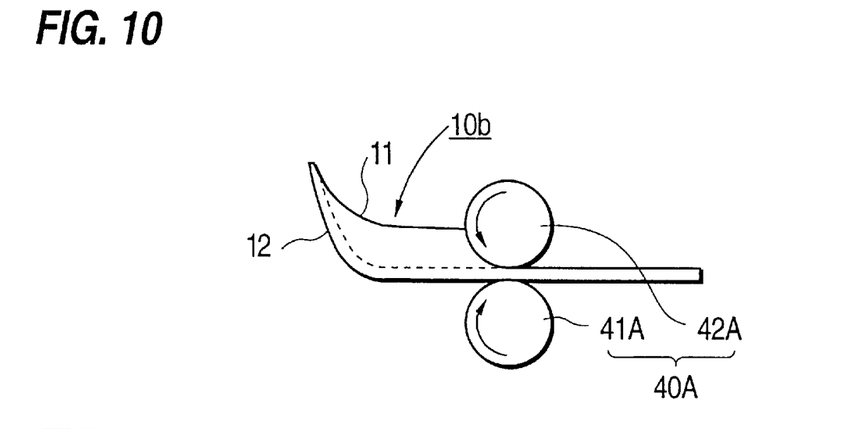
FIG. 10 is a schematic structural view showing the main portion of a sixth embodiment in the apparatus for removing a paint film formed on the surface of the resin material according to the present invention.

FIG. 10 is a schematic structural view of the main portion.

In FIG. 10, 10b is a molded product having a complicated solid shape, 11 is a resin material, and 12 is a paint film. Further, 40A is a rolling roll, 41A is a paint film side heating roll, and 42A is a resin material side heating roll.

On the molded product 10b having a complicated solid shape, is formed a flat portion in the same manner as in the above-described fourth embodiment. The rolling roll 40A can bite the flat portion of the molded product 10b to conduct compression deformation (rolling), and simultaneously heat the molded product 10b from the both sides of the resin material 11 side and the paint film 12 side with the paint film side heating roll 41A and the resin material side heating roll 42A.

That is, according to this embodiment, the molded product 10b is heated while deforming under compression the same with the paint film side heating roll 41A and the resin material side heating roll 42A, in place of the heater 30 in the above-described fourth embodiment.

Therefore, according to this apparatus, the paint film 12 can be removed in the same manner as in the above-described fourth embodiment, although the apparatus structure is more simplified compared with the apparatus in the above-described fourth embodiment.

[Seventh embodiment: Addition of stretching process]

Figure 11:
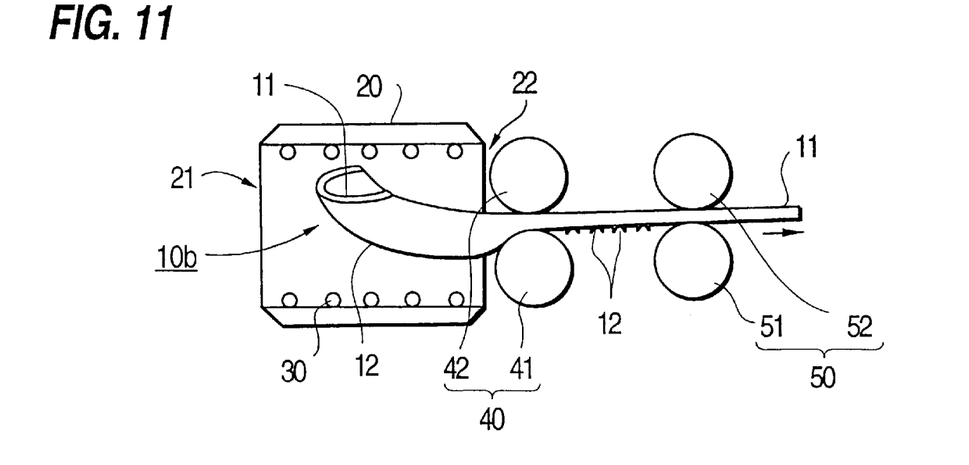
FIG. 11 is a schematic structural view showing the main portion of a seventh embodiment in the apparatus for removing a paint film formed on the surface of the resin material according to the present invention.

FIG. 11 is a schematic structural view of the main portion.

In FIG. 11, 10b is a molded product having a complicated solid shape such as a ship shape or a box shape, for example, bumpers of automobiles, 11 is a resin material, and 12 is a paint film. Further, 20 is a heating chamber, 21 is an inlet, and 22 is an outlet. 30 is a fluid medium heater or a radiation heater. Also, 40 is a rolling roll, 41 is a paint film side roll, and 42 is a resin material side roll. 50 is a stretching roll, 51 is a paint film side roll, and 52 is a resin material side roll.

The heating chamber 20 is provided with the heater 30 therein, and can heat the molded product 10b by passing the same therethrough from the inlet 21 to the outlet 22. The rolling roll 40 is arranged at an outer portion of the outlet 22 of the heating chamber 20. The stretching roll 50 is arranged at the downstream side than the rolling roll 40. The circumferential speed of the stretching roll 50 is higher than that of the rolling roll 40, and the roll distance thereof is smaller than that of the rolling roll 40. In this embodiment, a stretching means is constituted by the rolling roll 50 or the like, and a deformation means is constituted by the stretching means, the rolling roll 40, and the like.

According to this apparatus, both surfaces of the molded product 10b are heated with the heater 30 in the heating chamber 20, and since the top edge is previously subjected to shaping process, the molded product 10b can easily be bitten by the rolling roll 40 and subjected to compression deformation. The resin material 11 elongates by adding a tension by the stretching roll 50 after compression deformation, so that the paint film 12 having cracks caused by compression deformation is peeled from the resin material 11. Further, the resin material 11 shows plastic deformation by stretching. However, elasticity remains in the paint film 12, and recovery force by the elasticity energy acts. As a result, peeling by a shearing force occurs at the boundary surface, and the paint film 12 is removed. That is, the function explained in the fourth embodiment of the method of removing a paint film formed on the surface of resin material as described above acts, so that the paint film 12 can be removed.

In this apparatus, even if the molded product 10a having an approximately flat shape is used, the paint film 12 can be removed in the same manner as described above.

[Eighth embodiment: Addition of flattening process]

Figure 12:
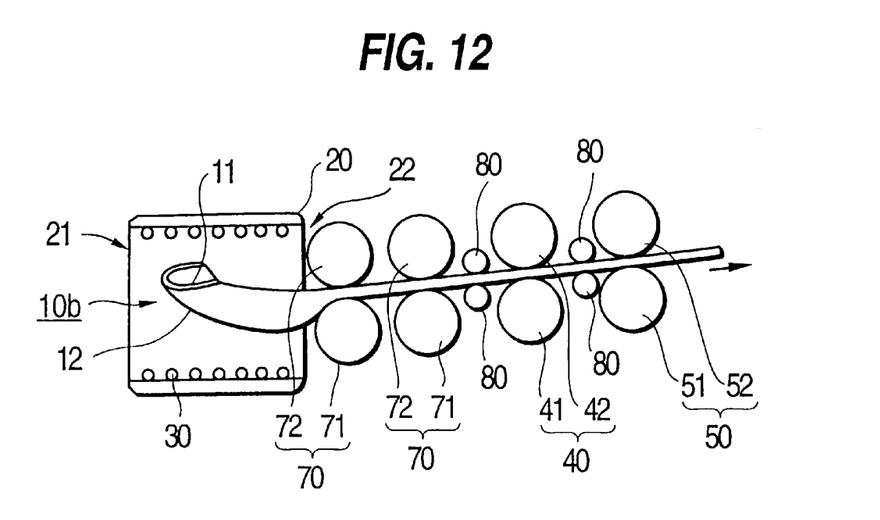
FIG. 12 is a schematic structural view showing the main portion of a eighth embodiment in the apparatus for removing a paint film formed on the surface of the resin material according to the present invention.

FIG. 12 is a schematic structural view of the main portion.

In FIG. 12, 10b is a molded product having a complicated solid shape such as a ship shape or a box shape, for example, bumpers of automobiles, 11 is a resin material, and 12 is a paint film. 20 is a heating chamber, 21 is an inlet, and 22 is an outlet. 30 is a fluid medium heater or a radiation heater. 40 is a rolling roll, 41 is a paint film side roll. and 42 is a resin material side roll. 50 is a stretching roll, 51 is a paint film side roll, and 52 is a resin material side roll. 70 is a flattening roll, 71 is a paint film side roll, and 72 is a resin material side roll. 80 is a guide roll.

Two pairs of the guide rolls 70 are arranged at the outer portion of the outlet 22 of the heating chamber 20. The rolling roll 40 is arranged at the downstream of the flattening roll 70. Each guide roll 80 is arranged between the flattening roll 70 and the rolling roll 40, and also between the rolling roll 40 and the stretching roll 50.

That is, this embodiment is provided with the flattening roll 70 in the above-described seventh embodiment. In this embodiment, a flattening means is constituted by the flattening roll 70 or the like.

According to this apparatus, both the surfaces of the molded product 10b are heated with the heater 30 in the heating chamber 20, and the top edge thereof is previously subjected to the shaping process, so that the molded product is easily bitten by the flattening roll 70 and flattened. The flattened molded product 10b is subjected to compression deformation by the rolling roll 40, and simultaneously the paint film 12 is peeled by the stretching roll 50.

Therefore, the paint film removal process can easily be applied even to the molded product 10b having a complicated solid shape.

[Ninth embodiment: Addition of cutting process]

Figure 13:
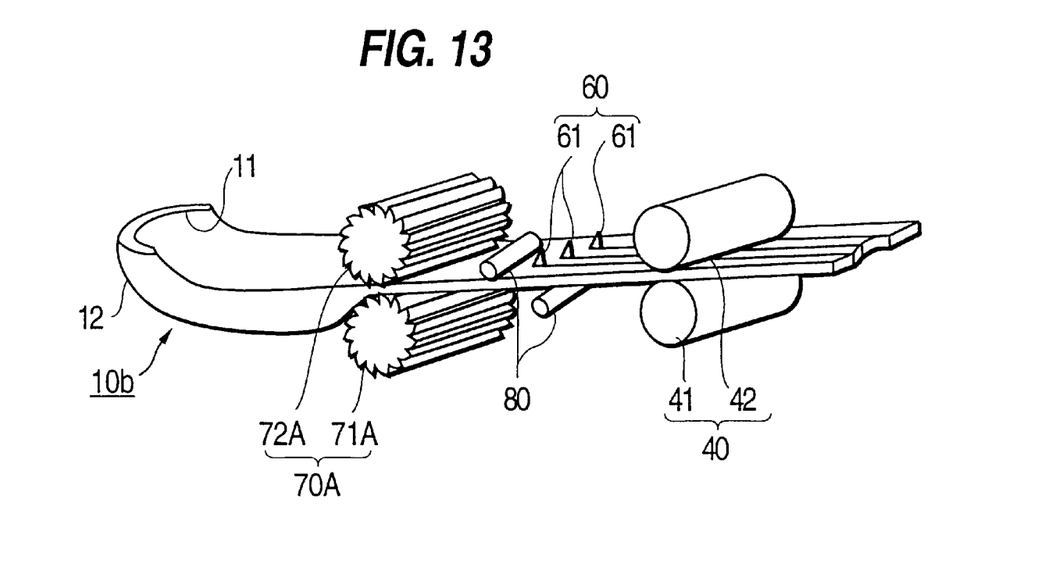
FIG. 13 is a schematic structural view showing the main portion of a ninth embodiment in the apparatus for removing a paint film formed on the surface of the resin material according to the present invention.

FIG. 13 is a schematic structural view of the main portion.

In FIG. 13, 10b is a molded product having a complicated solid shape such as a ship shape, 11 is a resin material, and 12 is a paint film. 40 is a rolling roll, 41 is a paint film side roll, and 42 is a resin material side roll. 60 is a cutting device, 61 is a rotary blade. 70A is a flattening roll, 71A is a paint film side toothed roll, and 72A is a resin material side toothed roll. 80 is a guide roll.

The paint film side toothed roll 71A and the resin material side toothed roll 72A in the flattening roll 70 have a cross sectional shape of a gear form in the direction crossing the axis, and teeth extending in the direction of generatorix of the cylinder surface are formed on the circumference. The cutting device 60 is arranged between the flattening roll 70 and the rolling roll 40, and is equipped with a plurality of rotary blades at a predetermined distance along the axial center direction of the roll 40, 70 in the direction of width of the molded product 10b. Although not shown, the molded product 10b can be heated with the same heater as in the above-described embodiment. In this embodiment, a cutting means is constituted by the cutting device 60 or the like.

According to this apparatus, the molded product 10b is finely cut in the direction of width by the rotary blade 61 of the cutting device 60. Therefore, the function as explained in the sixth embodiment of the method of removing a paint film formed on the surface of the resin material described above acts, and removal of the paint film 12 can be conducted in a stable manner. Further, the flattening roll 70A has the gear form as described above. Therefore, the flattening roll can strongly bite the molded product 10b softened by heating, and crush the same, and thus the flattening of the molded product 10b can easily be conducted.

Delivery force by the flattening roll 70 and take-off force by the rolling roll 40 act to the molded product 10b.

Therefore, cutting can be smoothly conducted even if the rotary blade 61 of the cutting device is replaced with a fixed blade. Further, in this embodiment, the flattening roll 70 having the gear form is used as the flattening means, but it is possible to apply the flattening roll 70 having a general columnar form as used in the above-described eighth embodiment, as the flattening means. Also, if the stretching means such as the stretching roll 50 as used in the above-described embodiment is applied to this embodiment, further good result can be obtained.

[Tenth embodiment: Addition of collecting process]

Figure 14:
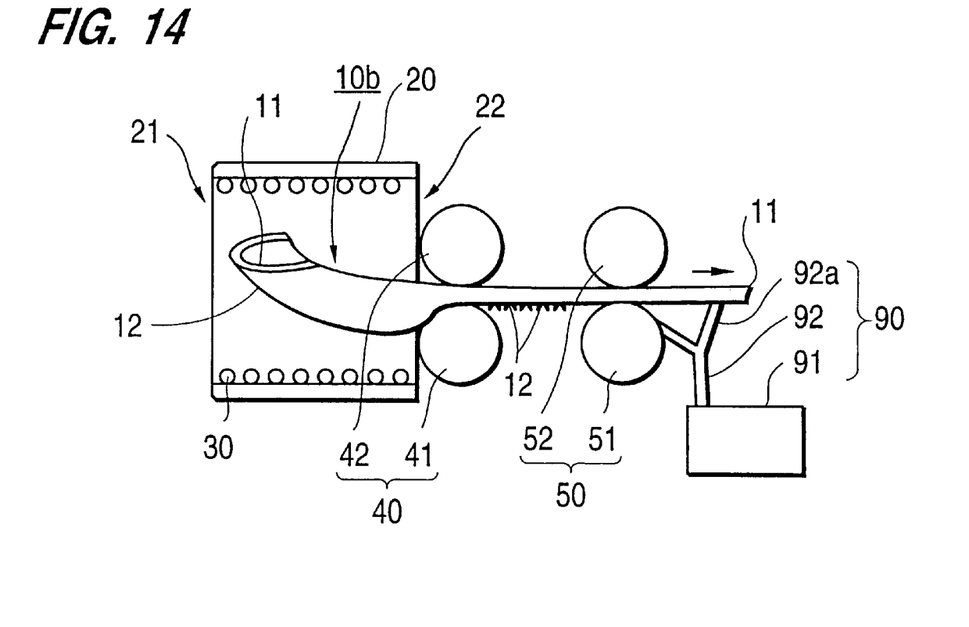
FIG. 14 is a schematic structural view showing the main portion of a tenth embodiment in the apparatus for removing a paint film formed on the surface of the resin material according to the present invention.

FIG. 14 is a schematic structural view of the main portion.

In FIG. 14, 10*b* is a molded product having a complicated solid shape such as a ship shape, 11 is a resin material, and 12 is a paint film. 20 is a heating chamber, 21 is an inlet, and 22 is an outlet. 30 is a fluid medium heater or a radiation heater. 40 is a rolling roll, 41 is a paint film side roll, and 42 is a resin material side roll. 50 is a stretching roll, 51 is a paint film side roll, and 52 is a resin material side roll. 90 is a collector, 91 is aspirator, 92 is a duct, and 92*a* is a suction port.

The collector 90 is arranged such that the suction port 92*a* of the duct 92 is placed at the vicinity of the surface of the roll 40, 50 and at the paint film 12 side portion of the molded product 10b near the roll 40, 50.

That is, this embodiment is provided with the collector 90 in the above-described seventh embodiment. In this embodiment, a collection means is constituted by the collector 90 or the like.

According to this apparatus, the paint film 12 peeled from the resin material 12 can be recovered without scattering, and working environment can be maintained cleanly.

If the cutting means such as the cutting device 60 and the flattening means such as the flattening roll 70, as used in the above-described embodiment, is applied to this embodiment, further good result can be obtained. Further, if the paint film 12 is peeled from the resin material 11 using a brush roll or the like, removal of the paint film 12 can be further securely conducted with the collector 90.

Figures 15A, 15B:
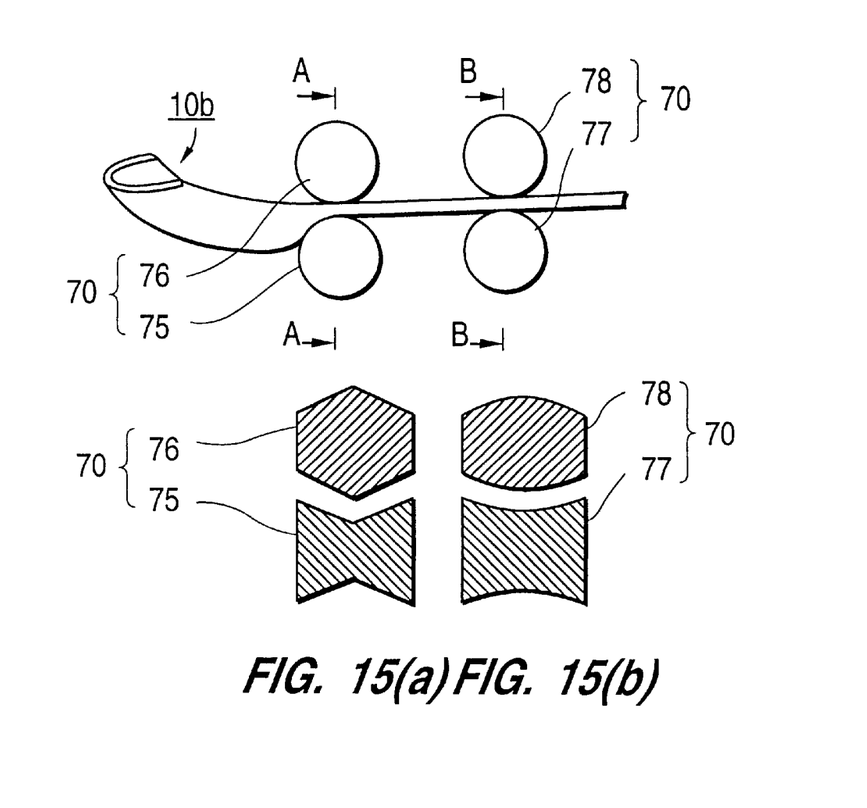
FIGS. 15(a) and 15(b) are schematic structural views showing the main portion of another example of the eighth and ninth embodiments in the apparatus for removing a paint film formed on the surface of the resin material according to the present invention.

In the above-described eighth and ninth embodiments, the flattening roll 70A having a gear form or a columnar form is used as the flattening means. However, if there is applied a flattening means such as the flattening roll 70 prepared by combining the paint film side approximately X form concave surface roll 75 wherein the cross section (A—A cross section in FIG. 15 (*a*)) along the direction of axial center is a concave shape of an approximately X form, and the resin material side approximately rhombic form convex surface roll 76 wherein the cross section (B—B cross section in FIG. 15 (*a*)) along the direction of axial center is a convex shape of an approximately rhombic form, as shown in FIG. 15 (*a*), or the flattening roll 70 prepared by combining the paint film side approximately drum form concave surface roll 77 wherein the cross section along the direction of axial center is a concave shape of an approximately hand drum form, and the resin material side approximately drum form convex surface roll 78 wherein the cross section along the direction of axial center is a convex shape of an approximately drum form, as shown in FIG. 15 (*b*), further good result can be obtained. The reason for this is explained below.

The molded product 10*b* having a complicated solid shape such as a ship shape or a box shape, represented by bumpers of automobiles or the like, generally has a concave shape, and the paint film 12 is applied to the outer surface thereof. Therefore, if the flattening roll 70 is used wherein the concave roll 75, 77 having an approximately X form or an approximately hand drum form is applied to the paint film 12 side of the molded product 10*b* and the convex roll 76, 78 having an approximately rhombic form or an approximately drum form is applied to the resin material 11 side of the molded product 10*b*, since the cross section shape in the direction crossing the delivery direction of the softened molded product 10*b* is almost similar to the cross section of the roll, the molded product 10*b* is delivered and simultaneously is easily sandwiched between the rolls to be corrected in respect to the shape, and then flattened.

If a plurality of the flattening rolls 70 are arranged along the pass line such that the shape of the flattening rolls 70 gradually changes from the shape of the molded product 10*b* to the flattened shape, the flattening process proceeds smoothly, and the subsequent step (compression deformation step) can be conducted more effectively.

Figure 16A:
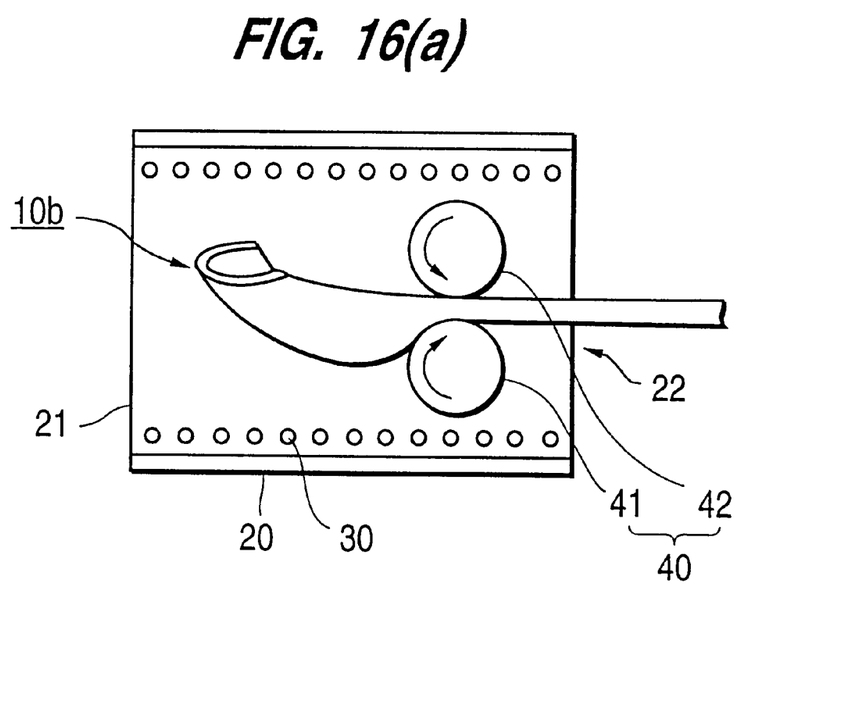
FIGS. 16(a) and 16(b) are schematic structural views showing the main portion of other examples of the first, third, fourth, and seventh to tenth embodiments in the apparatus for removing a paint film formed on the surface of the resin material.
Figure 16B:
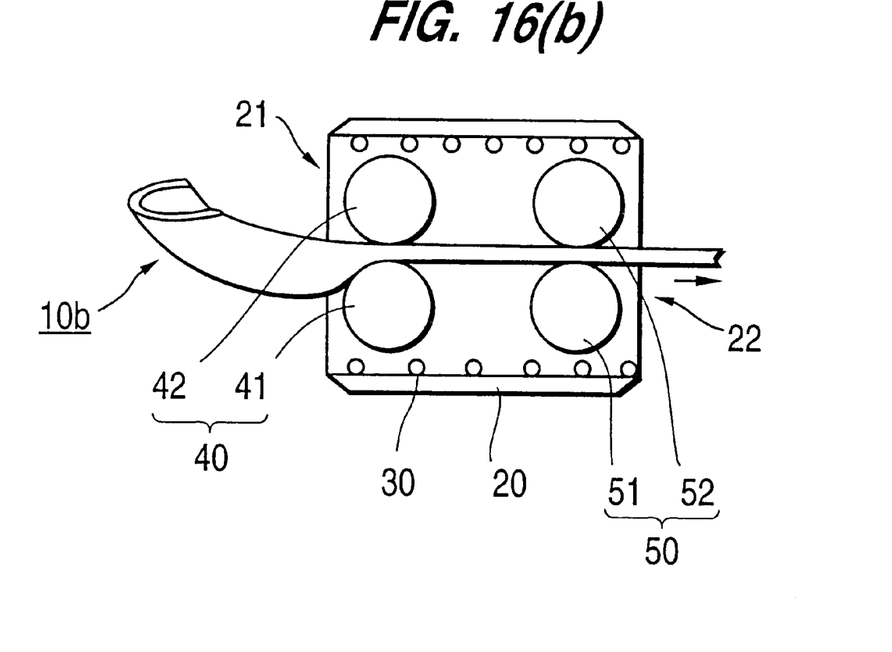

Further, in the above-described first, third, fourth, seventh, eighth, ninth and tenth embodiments, the molded product 10*b* is heated with the heater 30 and then subjected to the flattening process with the flattening roll 70, or subjected to compression deformation with the rolling roll 40. However, the molded product 10*b* may be heated and simultaneously subjected to compression deformation by arranging the rolling roll 40 inside the heating chamber 20 as shown in FIG. 16 (*a*), or the molded product 10*b* may be heated and simultaneously subjected to compression deformation and stretching by arranging the rolling roll 40 and the stretching roll 50 inside the heating chamber 20 as shown in FIG. 16 (*b*). Further, the cutting device and the collector as well as the flattening roll may be arranged inside the heating chamber.

Figure 17A:
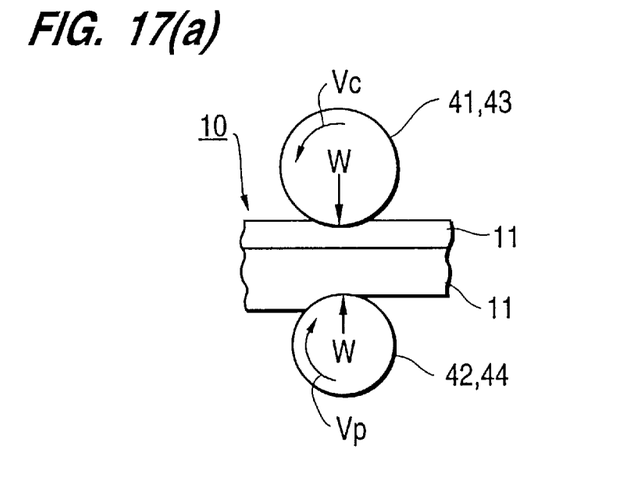
FIGS. 17(a) and 17(b) are views explaining the action that difference in the circumferential speed of rolls affects a shearing force.
Figure 17B:
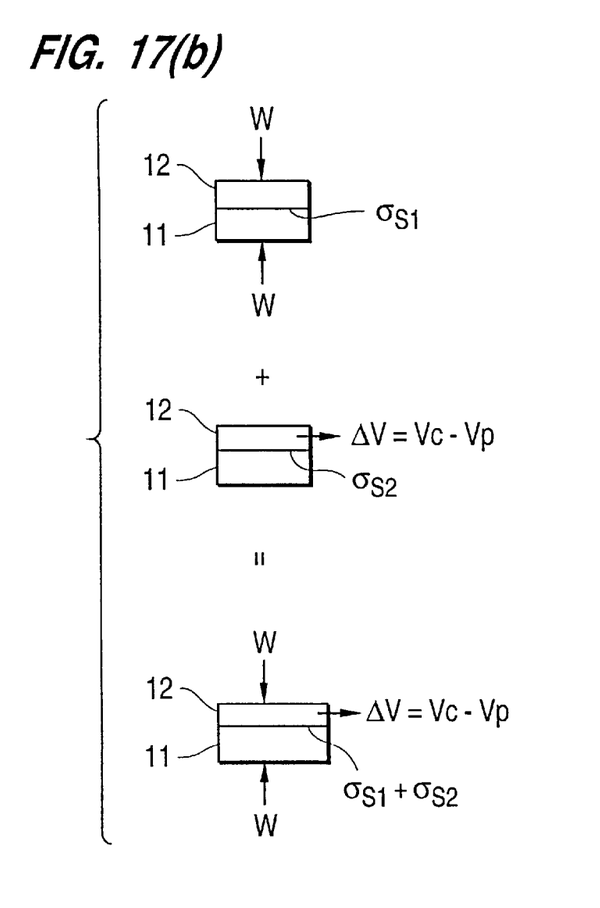
Figure 18:
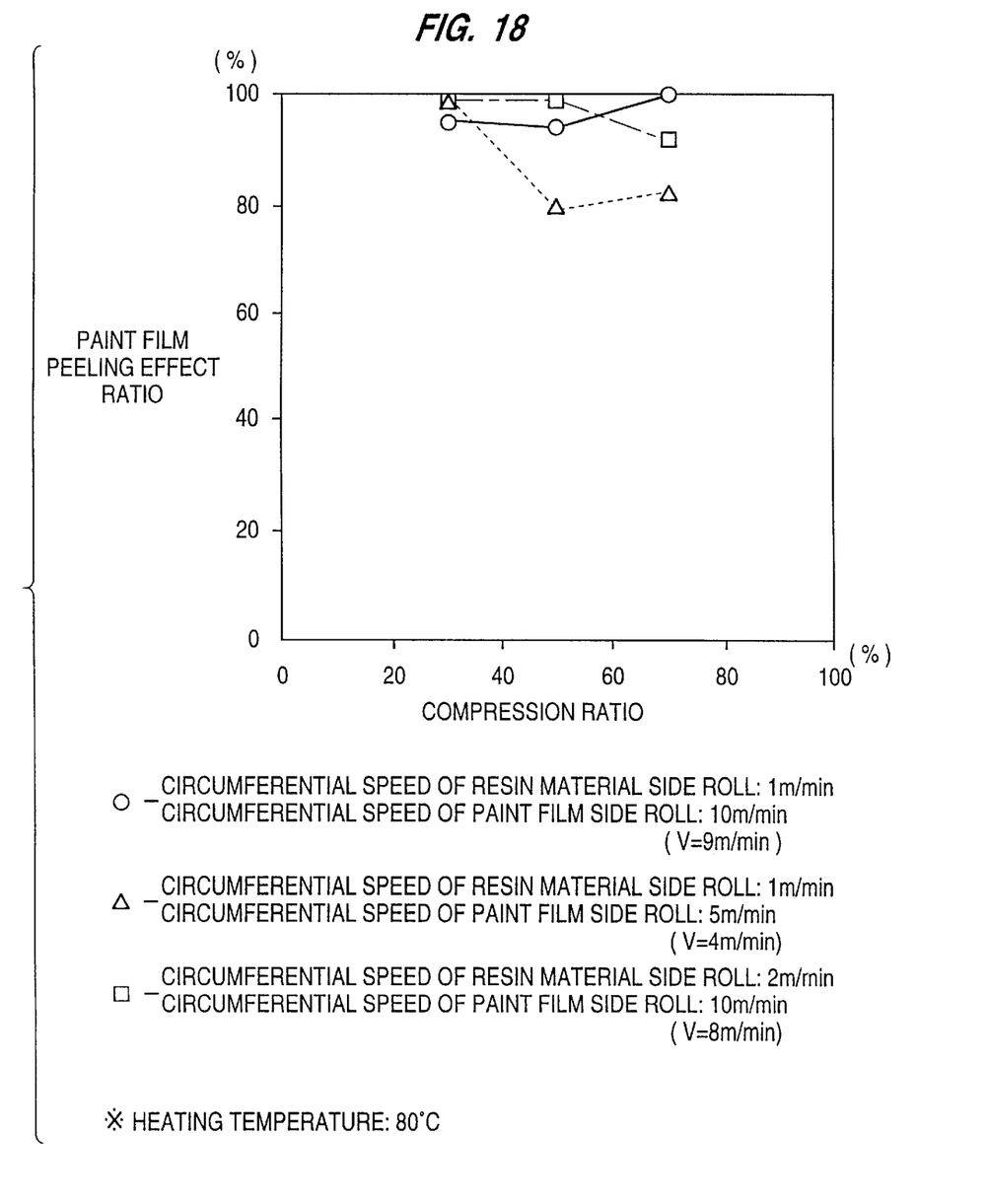
FIG. 18 is a graph showing the relationship between the circumferential speed of the rolls and the peeling effect of the paint film.

Further, in each of the above-described embodiments, if the circumferential speed of the paint film side roll 41, 43 in the rolling roll 40 is Vc, and the circumferential speed of the resin material side roll 42, 44 in the rolling roll 40 is Vp, wherein Vc>Vp, the shearing force $\sigma_s$ generated at the boundary surface between the resin material 11 and the paint film 12 in the molded product 10*b* is a size of a combination of the shearing force $\sigma_{s1}$ due to compression load W by the rolling roll 40 and the shearing force $\sigma_{s2}$ due to the difference (Vc−Vp=ΔV) of the above circumferential speed at fulcrum in the rolling roll 40 as shown in FIG. 17 (*b*). Therefore, if the circumferential speed difference and the roll facing distance (compression stress) are appropriately set, removal of the paint film 12 is further accelerated. From the experience, it is believed that the circumferential speed difference is preferably within the range of ΔV=6 to 9 m/min. From the result of the experiments (see FIG. 18), particularly as is apparent from the data shown by the square mark and circle mark in FIG. 18, it was clarified that the range of ΔV=8 to 9 m/min is preferred.

In the above-described embodiments, each one pair of various rolls is arranged, but a plurality of a pair of various rolls may be arranged depending on the shape and size of the molded product 10*a*, 10*b*. Further, each roller may be rotated with a single motor via gear or belt. However, in case that each roller has the respective different circumferential speeds, variable speed motor may be arranged to each roller, so that adjustment of the circumferential speed can easily be conducted every motor. Further, in order to adjust the facing distance of a pair of various rollers, an axis supporting those rollers is supported such that the axis can be moved and adjusted by a oil pressure cylinder, spring, screw or the like, or that the rollers can be moved and adjusted by pushing with back-up rollers or the like.

What is claimed is:

1. A method of removing a paint film from a surface of an article formed of a resin material, said method comprising:

heating at least the paint film to 70 to 150° C. in order to soften the paint film;

applying compression forces to the article by passing the article between a first pair of rolls and a second pair of rolls, wherein the resin material is plastically deformed by said compression forces;

applying an extension force to said article by operating said first pair of rolls at a peripheral speed which is different than a peripheral speed of said second pair of rolls; and removing said compression forces so as to induce a shear stress at an interface between the paint film and the resin material such that the paint film peels away from the resin material.

2. The method of removing a paint film as claimed in claim 1, further comprising flattening the article by application of said compression force produced by said first pair of rolls.

3. The method of removing a paint film as claimed in claim 2, further comprising cutting the article into separate pieces, wherein said cutting operation occurs after said flattening operation and before application of said compression force produced with said second pair of rolls.

4. The method of removing a paint film as claimed in claim 1, further comprising collecting the peeled paint film in a collection means.

5. The method of removing a paint film as claimed in claim 1, wherein said heating operation includes heating both an upper and a lower surface of the article.

6. The method of removing a paint film as claimed in claim 5, further comprising cutting the article into separate pieces, wherein said cutting operation occurs before application of said compression forces.

7. The method of removing a paint film as claimed in claim 6, further comprising collecting the peeled paint film in a collection means.

8. An apparatus for removing a paint film from a resin article, said apparatus comprising:

a heating means for heating at least the paint film to a temperature of at least 70 to 150° C.;

a first pair of rolls for applying a compressive force and deforming the article; and a second pair of rolls, disposed downstream of said first pair of rolls, for applying a compressive force to said article, wherein said first and second pair of rolls can be operated at different peripheral speeds in order to apply an extension force to the article.

9. The apparatus as claimed in claim 8, further comprising a flattening means for flattening the heated resin material prior to deformation of the heated resin material with said first and second pairs of rolls.

10. The apparatus as claimed in claim 9, wherein said first pair of rolls comprises a heating paint-side roll and a resin material side roll, and said heating means is defined by said paint side roll.

11. The apparatus as claimed in claim 9, wherein said heating means comprises a first heater for heating a paint side of the article and a second heater for heating a resin material side of said article.

12. An apparatus for removing a paint film from a resin article, said apparatus comprising:

a heating chamber having an inlet and an outlet;

a heating means, for heating at least the paint film to a temperature of at least 70 to 150° C., disposed in said heating chamber;

a first pair of rolls, for applying a compressive force and deforming the article, disposed downstream of said heating chamber; and a second pair of rolls, disposed downstream of said first pair of rolls, for applying a compressive force to said article, wherein said first and second pair of rolls can be operated at different peripheral speeds in order to apply an extension force to the article.

13. The apparatus as claimed in claim 12, wherein said first pair of rolls comprises a paint side toothed rolls and a resin material side toothed roll.

14. The apparatus as claimed in claim 12, further comprising a cutting device disposed between said first pair of rolls and said second pair of rolls.

15. The apparatus as claimed in claim 12, further comprising a paint film collector disposed downstream of said second pair of rolls.

16. The apparatus as claimed in claim 15, wherein said paint film collector includes suction means for suctioning said paint film from said resin material.

17. The apparatus as claimed in claim 15, wherein said first pair of rolls, said second pair of rolls and said collector are disposed in said heating chamber.

18. An apparatus for removing a paint film as claimed in claim 12, wherein said first pair of rolls comprises a first roll having a generally concave outer peripheral surface and a second roll having a generally convex outer peripheral surface.

* * * * *